United States Patent Office 2,708,771
Patented May 24, 1955

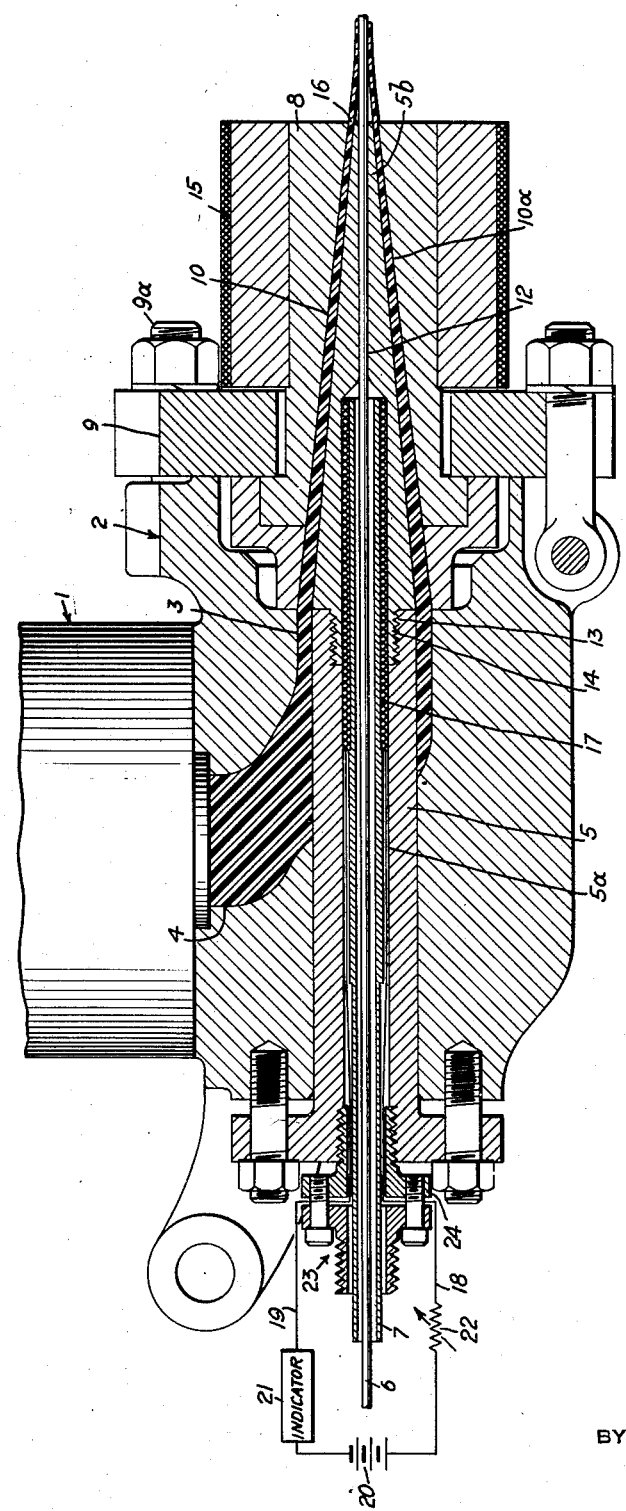

2,708,771

EXTRUSION APPARATUS

Ira T. Stoneback, North Caldwell, N. J., assignor to International Telephone and Telegraph Corporation, a corporation of Maryland Application June 5, 1952, Serial No. 291,847

6 Claims. (Cl. 18—13)

This invention relates to extrusion apparatus and more particularly to apparatus for the continuous extrusion of a plastic material about a wire conductor.

In the extrusion of plastic material it is of the utmost importance to maintain the temperature of the plastic material within very close limits. The heating of the material must be closely controlled to maintain the temperature at a proper value for the desired viscosity of the material without effecting a permanent thermally-caused change therein. If a temperature in excess of the critical limit is produced in the plastic material, the result is either a discolored or a deteriorated product or a product whose physical characteristics are inferior to those desired.

In the past, extrusion apparatus have utilized a barrel containing a screw type conveyer to transport the plastic material to the extruder head which holds the forming tools commonly called the tip and die. The barrel has been heated by the circulation of hot oil or by the use of electrical heating elements to maintain a desired temperature gradient as the material to be extruded was propelled toward the extruder tip and die. It was found that as the material entered the head and contacted the extruder tip, the desired temperature was difficult to maintain although additional heat was added by encircling the outer circumference of the die with heating means.

It has been found that known extrusion apparatus is unsatisfactory for the extrusion of a sheath about a wire core from plastic materials which have extremely critical temperature ranges, such as polymonochlorotrifluoroethylene. When it is desired to extrude a coating of such a material about a wire conductor, it is necessary to avoid excessive degradation of the plastic by maintaining extremely critical temperatures throughout the substance and using only a minimum of mechanical working. In the past it has been found that the optimum method of extruding a wire jacketing of such a material is to extrude a tube having a larger inside diameter than the outside diameter of the wire and drawing the extruded tube down to the size of the wire after it has left the extruder die. Since the required temperature of extrusion was very high, this operation was extremely difficult because the die could be heated to the required high temperature but the tip could not, and consequently, a substantial temperature difference existed between the inside and outside of the extruded tube. The drawing operation of the extruded tube down to the wire resulted in an unsatisfactory plastic sheath due to this temperature differential.

One of the objects of this invention, therefore, is to provide apparatus for the satisfactory extrusion of a plastic sheath about a wire conductor.

Another object of this invention is to provide apparatus for the satisfactory extrusion of a plastic sheath about a wire conductor wherein the extruded plastic does not exhibit a substantial temperature differential between its outside and inside surfaces.

A feature of this invention is the use of an extrusion die having a long tapered axially extending channel in which a long tapered tip is disposed in spaced relation to the inner walls of the die. The plastic material from the barrel of the extruder is propelled along this channel, and its outer surface is heated by heating means in or about the die while its inner surface is heated by a heating element contained in the tip. This double heating of the plastic in its travel along the tapered passage insures an even temperature throughout the body of the plastic which can be controlled within close limits. The wire to be coated is fed through a passage contained in the tip and is also heated by the heating element in the tip. As the wire is passed out of the extrusion apparatus, its temperature is equal substantially to the temperature of the extruded plastic sheath.

The above-mentioned and other features and objects of this invention will become more apparent by reference to the following description taken in conjunction with the accompanying drawings, in which:

The figure of the drawing is a cross-sectional view in elevation of one embodiment of extrusion apparatus in accordance with the principles of this invention.

Referring to the figure of the drawing, extrusion apparatus in accordance with the principles of this invention is shown comprising an extruder barrel 1 containing well-known means such as a screw type conveyer (not shown) to propel the plastic material from a hopper to the extruder head 2. The plastic material is heated to a predetermined temperature as it passes through barrel 1 by means such as hot circulating oil or electrical heating elements. The extruder head 2 comprises a heated block having an axially extending annular channel 3 communicating with a radial passage 4 through which the plastic material to be extruded is fed from the barrel 1. Disposed in a spaced relation to the walls of the channel 3 is a core 5 supporting the tip 5b both having a central axially extending passage 5a into which the tubular heating element is inserted and through which the wire 6 to be coated is fed. A die 8 having an axially extending opening therethrough is held against the extruder head 2 by retaining plate 9 and bolts 9a. The die 8 may take any well-known form, but in the preferred embodiment of the invention, the die 8 has a long truncated cone shaped opening 10 axially extending therethrough. Disposed in a spaced relation to the walls of opening 10, forming a cone shaped passage 10a, is a truncated cone shaped tip 5b having an axially extending channel 12 therethrough for passage of the wire 6. The outer end 13 of the core 5 is recessed to receive the screw head 14 of the tip 5b. When the tip 5b is coupled to the core 5, the axially extending channel 12 is aligned with opening 5a so that the wire 6 is fed through opening 5a and channel 12. The plastic material is propelled from barrel 1 through passage 4 to channel 3 and then to passage 10a. An annular heating element 15 surrounds the die 8 so that the plastic material will be heated to a predetermined temperature before it is extruded from orifice 16 to form a plastic sheath about wire 6. As hereinbefore mentioned, it has been found that the strata of plastic material adjacent the outer walls of the passageway was heated to a higher temperature than the strata of plastic material adjacent the inner walls of the extrusion channel. By using a more gradually tapering tip 5b than has been commonly used heretofore, I can now place a heating coil 17 within the core 5 extending into the tip 5b. In one embodiment of this invention the heating coil 17 is carried by a supporting tube 7. The tube 7 is inserted in the core 5 and tip 5b and maintained in place by support member 23 which is coupled to core 5 by means of bushing 24. Thus, as the plastic material is propelled through channel 3 and passage 10a, the strata adjacent the core 5 and tip 5b is also heated to a predetermined temperature. In addition, the wire 6 is heated by coil 17 until its temperature substantially equals the temperature of the extruded plastic material. Heating coil 17 may be connected to any suitable source of electrical energy 20 by leads 18 and 19 to a suitable external power control 22 and power indicator 21. By proper adjustment of power input to heaters 15 and 17, a more even temperature may be maintained throughout the plastic material as it is extruded from orifice 16 than has been heretofore attainable.

While I have described above the principles of my invention in connection with specific apparatus, it is to be clearly understood that this description is made only by way of example and not as a limitation to the scope of my invention as set forth in the objects thereof and in the accompanying claims.

I claim:

1. An apparatus for extruding a plastic sheath about a wire conductor comprising an extrusion head having an axially extending channel, means communicating with said channel for supplying plastic in a fluid state thereto, a core disposed axially in said channel having an axial opening therein through which said conductor is fed, a die coupled to said extrusion head having an opening extending therethrough communicating with said channel, a tubular tip disposed axially in said die opening and coupled to said core with the axial passage thereof aligned with said core's axial opening through which said conductor may be fed for the application of said sheathing, means to heat said die for heating said plastic material through the walls of said channel, and heating means extending axially through a substantial length of said tip for heating said conductor and also said plastic material through the walls of said tip.

2. An apparatus according to claim 1, wherein said heating means extending axially through a substantial length of said tip comprises a coil of high resistance wire coupled to a source of electrical energy.

3. An apparatus according to claim 2, which further includes means to adjust the amount of electrical current flowing through said high resistance wire.

4. An apparatus for applying a plastic sheath to a wire conductor comprising an extrusion head having an axially extending channel, means communicating with said channel for supplying plastic in a fluid state thereto, a core disposed axially in said channel having an axial opening therein through which said conductor is fed, a die coupled to said extrusion head having a truncated cone-shaped opening extending therethrough whose base is aligned with said channel, a truncated cone-shaped tip disposed axially in said die and coupled to said core having an axial opening aligned with said core's axial opening, means to heat said die to apply heat therethrough to the outer strata of said plastic material flowing through said channel, and heating means extending longitudinally for a substantial length in said tip for heating said conductor and applying heat to the inner strata of said plastic material.

5. An apparatus according to claim 4, wherein said heating means extending longitudinally through said tip further includes indicator means to indicate the operating characteristics of said heating means.

6. An apparatus for applying a plastic sheath to a wire conductor comprising an extrusion head having an axially extending channel, means communicating with said channel for supplying plastic in a fluid state thereto, a core disposed axially of said channel having a longitudinal passage therein, a die coupled to said extrusion head having a truncated cone-shaped opening extending therethrough whose base is aligned with said channel, a truncated cone-shaped tip disposed axially in said die opening and coupled to said core having an axial passage aligned with said core's passage, a supporting tube through which said conductor is fed, a coil of high resistance wire carried by said tube, means to dispose said tube within said core's passage and within said tip's axial passage for a substantial length of said tip, a source of electrical energy, means to couple said source of energy to said coil for heating said conductor and applying heat through the walls of said tip to the inner strata of said plastic material, and means to heat said die to apply heat therethrough to the outer strata of said plastic material flowing through said channel.

References Cited in the file of this patent

UNITED STATES PATENTS

| | | |
|---|---|---|
| 1,744,130 | McChesney et al. | Jan. 21, 1930 |
| 1,986,544 | Theuer | Jan. 1, 1935 |
| 2,332,438 | Smith | Oct. 26, 1943 |
| 2,446,057 | Morin | July 27, 1948 |
| 2,617,151 | Rubin | Nov. 11, 1952 |